US010493658B2

(12) United States Patent
Brands et al.

(10) Patent No.: US 10,493,658 B2
(45) Date of Patent: Dec. 3, 2019

(54) METHOD AND DEVICE FOR MANUFACTURING OF A FIBRE-REINFORCED POLYMER COMPOSITION

(71) Applicant: Saudi Basic Industries Corporation, Riyadh (SA)

(72) Inventors: Davy Wilhelmus Anna Brands, Geleen (NL); Tim Dassen, Geleen (NL)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 207 days.

(21) Appl. No.: 14/429,967

(22) PCT Filed: Oct. 3, 2013

(86) PCT No.: PCT/EP2013/070612
§ 371 (c)(1),
(2) Date: Mar. 20, 2015

(87) PCT Pub. No.: WO2014/053590
PCT Pub. Date: Apr. 10, 2014

(65) Prior Publication Data
US 2015/0246463 A1    Sep. 3, 2015

(30) Foreign Application Priority Data
Oct. 4, 2012  (EP) ..................... 12006885

(51) Int. Cl.
*B29B 9/14*      (2006.01)
*B29B 15/14*     (2006.01)
(Continued)

(52) U.S. Cl.
CPC ............... *B29B 15/14* (2013.01); *B29B 9/14* (2013.01); *B29B 15/122* (2013.01); *B29C 48/34* (2019.02);
(Continued)

(58) Field of Classification Search
CPC .. B29B 9/06; B29B 9/14; B29B 15/10; B29B 15/12; B29B 15/122; B29B 15/14;
(Continued)

(56) References Cited

U.S. PATENT DOCUMENTS 3,265,516 A * 8/1966 Triplett .................. D06M 15/11
139/420 C
4,338,233 A   7/1982 Das et al.
(Continued)

FOREIGN PATENT DOCUMENTS

DE        4218434 A1   12/1993
DE    102010045428 A1    3/2012
(Continued)

OTHER PUBLICATIONS

International Search Report and the Written Opinion of the International Searching Authority for PCT/EP2013/070612 dated Feb. 24, 2014, 11 pages.
(Continued)

*Primary Examiner* — Michael A Tolin
(74) *Attorney, Agent, or Firm* — Cantor Colburn LLP (57) ABSTRACT

The present invention is directed to a method of manufacturing a fiber-reinforced polymer composition comprising the steps of providing at least one multifilament strand comprising a plurality of continuous fiber filaments (5), applying an impregnating agent (10) to said strand to form an impregnated continuous multifilament strand, and embedding the impregnated continuous multifilament strand in a thermoplastic polymer material (3) for providing said fiber reinforced polymer composition, wherein said impregnating agent has a low viscosity at application temperature and is applied by jetting said impregnating agent onto the at least one continuous multifilament strand. The invention is further directed to a device (20) for use in such a method.

7 Claims, 5 Drawing Sheets

(51) Int. Cl.
  *B29C 48/34* (2019.01)
  *B29C 70/52* (2006.01)
  *B29B 15/12* (2006.01)
  *B29K 105/00* (2006.01)
  *B29K 23/00* (2006.01)
  *B29K 309/08* (2006.01)

(52) U.S. Cl.
  CPC .......... *B29C 70/521* (2013.01); *B29C 70/526* (2013.01); *B29K 2023/12* (2013.01); *B29K 2105/0005* (2013.01); *B29K 2309/08* (2013.01)

(58) Field of Classification Search
  CPC ..... B29C 47/0014; B29C 47/28; B29C 70/52; B29C 70/521; B29C 70/523; B29C 70/526; B29C 48/05; B29C 48/34; B29K 2023/12; B29K 2105/0005; B29K 2309/08; D06B 1/08; D06B 3/02; D06B 3/04; D06B 3/045; D06B 3/06; D06B 5/04; D06B 5/06
  See application file for complete search history.

(56) References Cited

U.S. PATENT DOCUMENTS

| | | | |
|---|---|---|---|
| 4,986,948 A * | 1/1991 | Komiya | B29C 43/3607 264/257 |
| 5,766,357 A * | 6/1998 | Packer | B29B 15/122 118/307 |
| 5,824,157 A | 10/1998 | Foster et al. | |
| 5,935,508 A | 8/1999 | Fernyhough et al. | |
| 6,264,746 B1 | 7/2001 | Peng | |
| 6,548,167 B1 | 4/2003 | Mieck et al. | |
| 2003/0235688 A1 | 12/2003 | Mizukami et al. | |
| 2009/0297848 A1 | 12/2009 | Itoh | |
| 2010/0068518 A1 | 3/2010 | Honma et al. | |
| 2010/0313605 A1 * | 12/2010 | Soliman | B29B 9/14 65/442 |
| 2015/0239153 A1 | 8/2015 | Biemond et al. | |
| 2017/0361498 A1 | 12/2017 | Brands et al. | |
| 2018/0104856 A1 | 4/2018 | Biemond et al. | |

FOREIGN PATENT DOCUMENTS

| | | |
|---|---|---|
| EP | 0206189 A1 | 12/1986 |
| EP | 0397505 A2 * | 11/1990 |
| EP | 1460166 A1 | 9/2004 |
| WO | 9806551 A2 | 2/1998 |
| WO | 2006119752 A1 | 11/2006 |
| WO | 2009080281 A1 | 7/2009 |
| WO | WO 2011/131664 A1 * | 10/2011 |

OTHER PUBLICATIONS

International Search Report and the Written Opinion of the International Searching Authority for PCT/EP2013/069786 dated Jan. 13, 2014, 9 pages.

* cited by examiner

METHOD AND DEVICE FOR MANUFACTURING OF A FIBRE-REINFORCED POLYMER COMPOSITION

This application is a national stage application of PCT/EP2013/070612 filed on Oct. 3, 2013, which claims priority to European Application EP12006885.3 filed on Oct. 4, 2012, both of which are hereby incorporated by reference in their entirety.

FIELD OF THE INVENTION

The present invention is directed to a method of manufacturing a fibre-reinforced polymer composition, comprising the steps of providing at least one multifilament strand comprising a plurality of continuous fibre filaments, applying an impregnating agent to said strand to form an impregnated continuous multifilament strand, and applying a sheath of thermoplastic polymer material around the impregnated continuous multifilament strand for providing said fibre reinforced polymer composition.

The present invention further relates to a device (a die) for use in such a method.

BACKGROUND

Fibre-reinforced polymers, such as long-glass fibre-reinforced polypropylene (LGF-PP), are known for their use in structural parts such as in various parts of the structural frames of vehicles. Such compositions are available in a number of variants, differing for example in fibre length or the in the type of polymer used for embedding the fibres. These materials are usually made available as granules or pellets, being created from suitably prepared strands of fibres.

On the high end, much effort is made on uniform distribution of fibres across pellets or granules. This poses some technological challenges in the manufacturing process, which usually at least consists of a step of embedding the fibres of a multifilament strand in a molten polymer composition. The fibres may for example be immersed in a polypropylene melt, cooled down after immersion, and cut into pellets or granules. Prior to and during immersion, the pulling force or load on the strand may be lowered or released in order to enable the individual fibre filaments of the strand to spread such as to yield a dispersed fibre distribution within the pellets.

A disadvantage of this method is that it is difficult to achieve proper distribution. The additional steps for enhancing fibre dispersion can only properly be performed at low speed for various reasons, e.g. since the individual filaments are more prone to breaking than the strand as a whole. The manufacturing process for making such high-end good quality LGF-PP pellets is therefore rather slow, limiting the yield of the process significantly and thereby resulting in higher costs.

Another method of manufacturing long-glass fibre-reinforced polypropylene (LGF-PP) is disclosed in International application no. WO 2009080281. In this method, use is made of an impregnating agent that is applied to a multifilament strand comprising a plurality of continuous fibre filaments (or fibres) wherein the strand(s) are surrounded by a thermoplastic polymer material by means of a sheathing step. The sheathed embedded strand is then cut into pellets. The impregnating agent is used to enhance dispersion of the fibres within the thermoplastic polymer matrix during downstream processing such as injection moulding, making any additional steps for enhancing dispersion during the step of making the pellets superfluous. As a result, the manufacturing process may be performed at much higher speeds, while still providing good quality pellets. The costs of making the LGF-PP granules or pellets are therefore much lower.

Applying the impregnating agent to the multifilament strand, however, still forms a challenge. The impregnating agent consists of a low viscous liquid at application temperature, for example a highly branched polyethylene wax mixed with a hydrocarbon oil or wax like a paraffin oil. The viscosity level is low, as a low viscosity ensures proper penetration of the strand to reach the inner filaments.

A known manner of applying a liquid coating to a single-filament fibre, such as an optical fibre, is to use a die through which the fibre filament is conveyed. The coating agent is applied by feeding the agent to a pressure chamber through which the fibre filament is conveyed, thereby immersing the fibre filament in the pressurized coating agent. The application of the pressure chamber requires the diameter of the entrance and exit openings of the coating device to be controlled accurately. A too large gap between the optical fibre and the entrance or exit die may result in coating coming out of the coating device.

DE102010045428 discloses a method for preparing a composite material consisting of a fibre strand that has been impregnated with a matrix material. The composite material is prepared by pneumatically conveying a fiber strand through a transport channel and adding matrix material to the fibre strand while it is so transported. The matrix material is added through an impregnation channel. The method and device of this publication are directed to the preparation of a composite material that is ready for (end) use to manufacture articles. Typically matrix resins, such as for example polypropylene, are high molecular weight materials. The present invention is directed to the application of a relatively low molecular weight impregnating agent to a multifilament strand followed by applying a sheath over the impregnated multifilament strand.

WO2006119752 discloses a method of applying a functional additive or a portion of a polymeric matrix material to a fibrous material wherein the fibrous material is conveyed through a blowing channel, together with the functional additive and or the portion of the polymeric matrix material under a pressure above ambient pressure and at a speed of more than 20 ms.

A problem with multifilament strands used for producing fibre reinforced polymer compositions, is that the shape and diameter of the strands varies across the length and width thereof. The term multifilament strand herein should be interpreted broadly as meaning a plurality of bundled fibre filaments, wherein a fibre filament refers to a single individual fibre. The term strand therefore also includes yarns (which are collections of filaments or strands twisted together) and rovings or roves (a collection of strands wound together). With respect to the varying shape and diameter, it is to be understood that the strands are usually provided to the manufacturing method as wound on bobbins, where the ends of strands of multiple bobbins are lashed together such as to form a single roving wound on multiple interconnected bobbins. At the lashes the thickness of the multifilament strand is approximately doubled. The lashes for example cannot be made by attaching the ends of the strands in each others prolongation, i.e. end-to-end (which would keep the diameter increase within limits), but instead the strands are usually linked by aligning them side-by-side and sewing them together using a lashing line. In addition, the multifilament strand usually is not circular in cross section but generally is rectangular in shape. In view of the unwinding of the bobbins the multifilament strand usually twists before entering the device for application of the impregnation agent.

As a result of the diameter variations in the strands, the device for applying the impregnating agent or coating agent should have entrance and exit openings, and a transport section, having a diameter in cross section being at least slightly larger than the largest expected local diameter of the strands. Otherwise, the strand may become stuck in the die and break, causing delay and loss in the manufacturing process. It is thus not possible to use the abovementioned method used for single filament fibres for applying a coating agent or an impregnating agent to the fibre filaments of a multifilament strand. As will be appreciated, methods and arrangements for coating or surface processing of (single-filament) optical fibres are usually dimensioned such as to accurately fit the cross-sectional shape of such a fibre. In order to achieve the desired optical performance, the cross-sectional shape and diameter of an optical fibre is usually well defined and consistent across its length. Therefore, there is no need to account for variations in solutions for coating an optical fibre.

In order to properly provide also the inner filaments of a multi-filament strand with impregnating agent, a much higher pressure is required. In case the entrance and exit openings are made large enough to convey also the thicker parts of a multifilament strand (such as the lashes), a sufficiently large pressure in the transport section of the die cannot be achieved for applying the low viscous coating liquid (or impregnating agent), since this would cause the coating liquid to flow out of the die openings.

SUMMARY OF THE INVENTION

It is an object of the present invention to alleviate the abovementioned problems at least in part, and to provide a method of manufacturing of a fibre-reinforced polymer composition comprising the application of an impregnating agent to a multifilament strand of fibres, yielding efficient impregnation of the strand.

It is another object of the present invention to provide a device for enabling the application of an impregnating agent to a multifilament strand of fibres.

The above mentioned object is achieved in that there is provided a method of manufacturing a fibre-reinforced polymer composition comprising the steps of:
providing at least one continuous multifilament strand comprising a plurality of continuous fibre filaments,
applying an impregnating agent to said strand to form an impregnated continuous multifilament strand, and
embedding the impregnated continuous multifilament strand in a thermoplastic polymer material for providing said fibre reinforced polymer composition,
wherein said impregnating agent has a low viscosity of from 2.5 to 100 cS at application temperature and is applied by jetting said impregnating agent onto the at least one continuous multifilament strand, wherein said jetting is performed by pressurizing the impregnating agent and conveying it through at least two jetting channels or through a jetting slit towards the at least one multifilament strand.

The term "embedding" in the context of the method of the present invention is to be understood as the application of a sheath of thermoplastic polymer material. As such the present invention provides for a method of manufacturing a fibre-reinforced polymer composition comprising the steps of:
providing at least one continuous multifilament strand comprising a plurality of continuous fibre filaments,
applying an impregnating agent to said strand to form an impregnated continuous multifilament strand, and
applying a sheath of thermoplastic polymer material around the impregnated continuous multifilament strand for providing said fibre reinforced polymer composition,
wherein said impregnating agent has a low viscosity of from 2.5 to 100 cS at application temperature and is applied by jetting said impregnating agent onto the at least one continuous multifilament strand, wherein said jetting is performed by pressurizing the impregnating agent and conveying it through at least two jetting channels or through a jetting slit towards the at least one multifilament strand.

Pellets are produced by cutting the embedded (sheathed) impregnated continuous multifilament strand into pellets having a certain length of for example from 5-25 mm, more preferably from 10-15 mm.

The invention is based on the insight that the individual fibre filaments may be provided with impregnating agent by jetting the impregnating agent under pressure onto the multifilament strand. In this manner, the force at which the jet of impregnating agent is received at the strand can be used for making the impregnating agent penetrate the strand to reach the individual fibre filaments and/or to better cover the surface of the multifilament strand. This enables to apply the impregnating agent without the necessity to build up pressure in the direct vicinity of the strand, and thereby overcomes the problems with prior art coating methods, in particular those used in the coating of optical fibres. The invention releases design constraints in the vicinity of the multifilament strand within a device for applying an impregnating agent, hereinafter sometimes also referred to as die, e.g. with respect to the dimensions or sealing of a transport section within the die, i.e. the section through which the multifilament strand is conveyed. Such a transport section may be designed having a diameter in cross section such as to allow for any diameter variations of the strand. The transport section may also comprise entrance and exit openings being sufficiently wide for this purpose.

The improved coverage of the surface of the multifilament strand has the additional effect in that it reduces an amount of glass filaments separating from the pellets comprising a thermoplastic polymer sheath intimately surrounding (embedding) the glass filaments when such pellets are subjected to repetitive mechanical loads or upon transportation of the pellets through a piping system or by means of a vibrating conveyor means. The inventors believe that the method and device according to the present invention improve the mechanical coupling between the multifilament strand and the thermoplastic polymer sheath and also the mechanical coupling between the fibre filaments.

The low viscous impregnating agent is pressurized in a pressure chamber, such as an annular pressure chamber arranged around the transport section of the device. As will be appreciated, another possibility is to provide the low viscous impregnating agent at sufficient pressure to a die, for jetting the impregnating agent onto the fibre within the die.

From the pressure chamber to the transport section wherein the multifilament strand is conveyed, a plurality of jetting channels or a jetting slit enable the impregnating agent to flow under pressure towards the strand. The impregnating agent flows from orifices at the end of each jetting channel, or alternatively from the outflow opening of the jetting slit, to the strand in the form of a jet. These orifices and/or outflow opening may be properly shaped and dimensioned such as to optimize flow conditions.

According to a preferred embodiment, at least two jetting channels are, and/or the jetting slit is, concentrically arranged around the at least one multifilament strand, and extend in a radial direction relative to the at least one strand conveyed in the transport section. This enables to apply the impregnating agent to the strand from a plurality of concentrically arranged directions onto the strand, so as to apply the impregnating agent from several directions. The skilled person will appreciate that a jetting slit will by definition provide an evenly distributed impregnation as the slit is continuous in radial direction.

The jetting channels and/or the jetting slit may extend transverse to the axial direction of the at least one strand or under an angle therewith. It may be appreciated that the force at which the jet is received at the strand will be maximum when the jet is slightly in counter direction to the movement of the strand in the die. However, very good results have been achieved by jetting the low viscous impregnating agent to the strand under a slight angle to the axial direction through the fibre, wherein the angle is selected such that the impregnating agent is jetted under an angle slightly in the same direction as the direction of movement of the strand. Therefore, according to a further embodiment the jetting channels and/or the jetting slit extend under an angle with the axial direction of the strand, wherein the angle is such as to jet the impregnating agent into at least one of the downstream direction or the upstream direction of the strand. Defining the radial direction (i.e. perpendicular) relative to the direction of motion as being 90° ($\pi/2$) to the axial direction of the strand, the angle may for example be optimally selected within a range of 45° to 135° ($\pi/4$ to $3\pi/4$), and more preferably 60° to 120° ($2\pi/6$ to $4\pi/6$), such as but not limited to 65°, 70°, 75°, 80°, 85°, 90°, 95°, 100°, 105°, 110°, or 115°, or any other angle falling within the given ranges. Within the given ranges, the angle may be determined by optimisation, i.e. adjusting the angle dependent on the results achieved in terms of, for example, uniformity of the coating properties across inner and outer fibre filaments of the strand, and yield of the process in terms of throughput against minimisation of failure.

According to a further embodiment of the present invention, the jetting channels each comprise an outflow orifice directing the impregnating agent to the at least one strand, wherein a pressure $p_0$ at the outflow orifice is smaller than a pressure $p_1$ at which the impregnating agent is pressurized, and wherein the pressure difference $p_1-p_0$ is smaller than 40 bar ($<4*10^6$ Pa), preferably smaller than 30 bar ($<3*10^6$ Pa), more preferably smaller than 20 bar ($<2*10^6$ Pa), or even more preferably within a range of 0.2 to 4 bar ($2*10^4$ Pa to $4*10^5$ Pa). Alternatively, the jetting slit comprises an outflow opening directing the impregnating agent to the at least one strand, wherein a pressure $p_0$ at the outflow opening is smaller than a pressure $p_1$ at which the impregnating agent is pressurized, and wherein the pressure difference $p_1-p_0$ is smaller than 40 bar ($<4*10^6$ Pa), preferably smaller than 30 bar ($<3*10^6$ Pa), more preferably smaller than 20 bar ($<2*10^6$ Pa), or even more preferably within a range of 0.2 to 4 bar ($2*10^4$ Pa to $4*10^5$ Pa)

The jetting channels or jetting slit may be arranged for jetting the impregnating agent at a single axial position along the strand in the die. However, according to a further embodiment jetting channels or jetting slits may also be arranged for jetting the impregnating agent at various axial positions along the strand. Therefore according to a further embodiment a plurality of jetting units, each of which comprising at least two jetting channels or a jetting slit are arranged at various axial positions along said continuous strand for jetting the impregnating agent on the at least one strand. For the avoidance of doubt it is to be understood that a jetting unit jets impregnating agent on the strand at only one axial position. In a preferred embodiment the radial position of the jetting channels of a first jetting unit is offset with respect to the radial position of the jetting channels of a second jetting unit. This configuration will allow the impregnating agent to be applied more effectively and will allow improved coverage of the surface along the circumference of the strand.

According to a further embodiment of the present invention, the step of applying the impregnating agent is performed inside a device or die, wherein the die comprises a transport section having an entrance opening and an exit opening for conveying the at least one multifilament strand, the transport section and the entrance and exit openings having a diameter in cross section larger than a maximum diameter of the at least one multifilament strand for enabling the passage of diameter variations of the strand(s). As mentioned above, the diameter in cross section of the multifilament strand is often variable and the shape of the cross section of the strand is usually not circular. An important benefit of the method and device according to the present invention is that it allows for releasing constraints on the dimensions of the transport section through which the multifilament strand is conveyed. This benefit is used in the present embodiment for widening the diameter of the entrance and exit openings, and the cross section of the transport section, such as to reduce the risk of blocking or breaking of the strand during the production process. In the method and device according to the present invention the difference in pressure between the surrounding of the device and the transport section is substantially 0, so that there is no driving force for impregnating agent to escape from the device. Consequently the diameter of the exit and/or entrance opening may be such that, in use, the total surface area of the exit and/or entrance opening which is not occupied by the at least one multifilament strand is larger than the total surface area of the orifices from which the impregnating agent is jetted onto the at least one multifilament strand. Preferably such free surface area is between 5 and 20%, more preferably between 5 and 10% larger than the total surface area of the orifices or outflow opening(s) from which the impregnating agent is jetted onto the at least one multifilament strand.

In the method according to the present invention the at least one continuous multifilament strand is pulled through the device for applying the impregnating agent. The method therefore differs significantly from the method as disclosed in DE102010045428. That method requires the use of air drag to transport the fibre strand through a transport channel. The use of air drag however is not be suitable in the method of the present invention for several reasons. First of all, the viscosity of the impregnating agent at application temperature is relatively low. Using air drag as the transporting mechanism for the multifilament strand would result in a significant amount of the impregnating agent being lost by pushing it out of the impregnating device at the exit opening thereof. To the contrary, one of the objects of the present invention is to prevent just that. Secondly, the use of air drag may result in bad impregnation of the multifilament strand because the flowing air will form a surface layer around the multifilament strand which reduces the speed at which the impregnating agent is jetted onto the multifilament strand. If said speed is lowered, the dispersion of the impregnating agent in the multifilament strand will be hindered. Thirdly, the use of air drag may result in the inclusion of air bubbles in the composition after the thermoplastic polymer sheath has been applied. Air bubbles in the composition may, in turn, be problematic when injection moulding said composition into an article.

Hence, the method of the present invention does not include the transport of the multifilament strand through a device for applying an impregnating agent by means of air drag.

According to a second aspect of the present invention there is provided a device or die for applying an impregnating agent having a low viscosity of from 2.5 to 100 cS at application temperature to a continuous multifilament strand comprising a plurality of continuous fibre filaments, the device comprising a transport section for receiving and conveying at least one continuous multifilament strand, and at least one impregnating section for receiving the impregnating agent and for applying the impregnating agent to the at least one strand, said impregnating section comprising a jetting unit for jetting pressurized impregnating agent onto the at least one strand while said at least one strand is conveyed through the transport section, so as to form an impregnated continuous strand wherein the jetting unit comprises a plurality of jetting channels or a jetting slit for conveying the pressurized impregnating agent towards the at least one continuous multifilament strand The device may be used to apply the impregnating agent in accordance with the method of the present invention.

The jetting channels and/or the jetting slit in the device extend transverse to or under an angle with an axial direction of said transport section, and if said jetting channels or said jetting slit extend under an angle with an axial direction of said transport section, said angle being such as to jet the impregnating agent into at least one of the downstream direction or upstream direction relative to the direction of conveying of the strand in use.

Preferably the plurality of jetting channels are, or a jetting slit is, arranged concentrically around the transport section, and the jetting channels and/or jetting slit extend in a radial direction relative to the transport section, wherein in use the continuous strand is conveyed in axial direction through the transport section.

In a preferred embodiment of the device according to the present invention, the device contains a plurality of jetting units or impregnating sections extending axially along the transport section. This preferred configuration allows the impregnating agent to be applied at several positions along the transport section, which provides a more efficient and more complete impregnation. Preferably the plurality of impregnating sections or jetting units each comprise jetting channels having an outflow orifice, said jetting channels extending perpendicular to or under an angle with an axial direction of said transport section and a radial location of the outflow orifices (seen in a device cross section perpendicular to the conveying direction of the at least one continuous strand in the transport section) of a first impregnating section or jetting unit is offset from a radial location of the outflow orifices of a second impregnating section. This preferred embodiment has the advantage that it reliefs certain design constraints on the device. For example, it allows jetting units having only two jetting channels while still having a good impregnation over de circumference of the at least one multifilament strand.

In an embodiment the jetting unit(s) comprise a jetting slit which is continuous in radial direction. In use the impregnating agent is conveyed through the slit and jetted onto the multifilament strand(s).

According to a third aspect of the present invention there is provided a glass fibre reinforced polymer composition manufactured using a method as described hereinabove and comprising a plurality of fibre filaments embedded in a polymer material composition, said fibre filaments being impregnated with an impregnating agent.

The outflow orifice or the outflow opening of the device of the present invention is in communication via the plurality (i.e. at least two) of jetting channels or said jetting slit with a pressure chamber for pressurizing the impregnating agent.

The present invention will now be further explained based on the following non-limiting drawings.

BRIEF DESCRIPTION OF THE DRAWINGS

The invention will further be elucidated by description of some specific embodiments thereof, making reference to the attached drawings, wherein.

DETAILED DESCRIPTION

Figures 1, 2A, 2B:
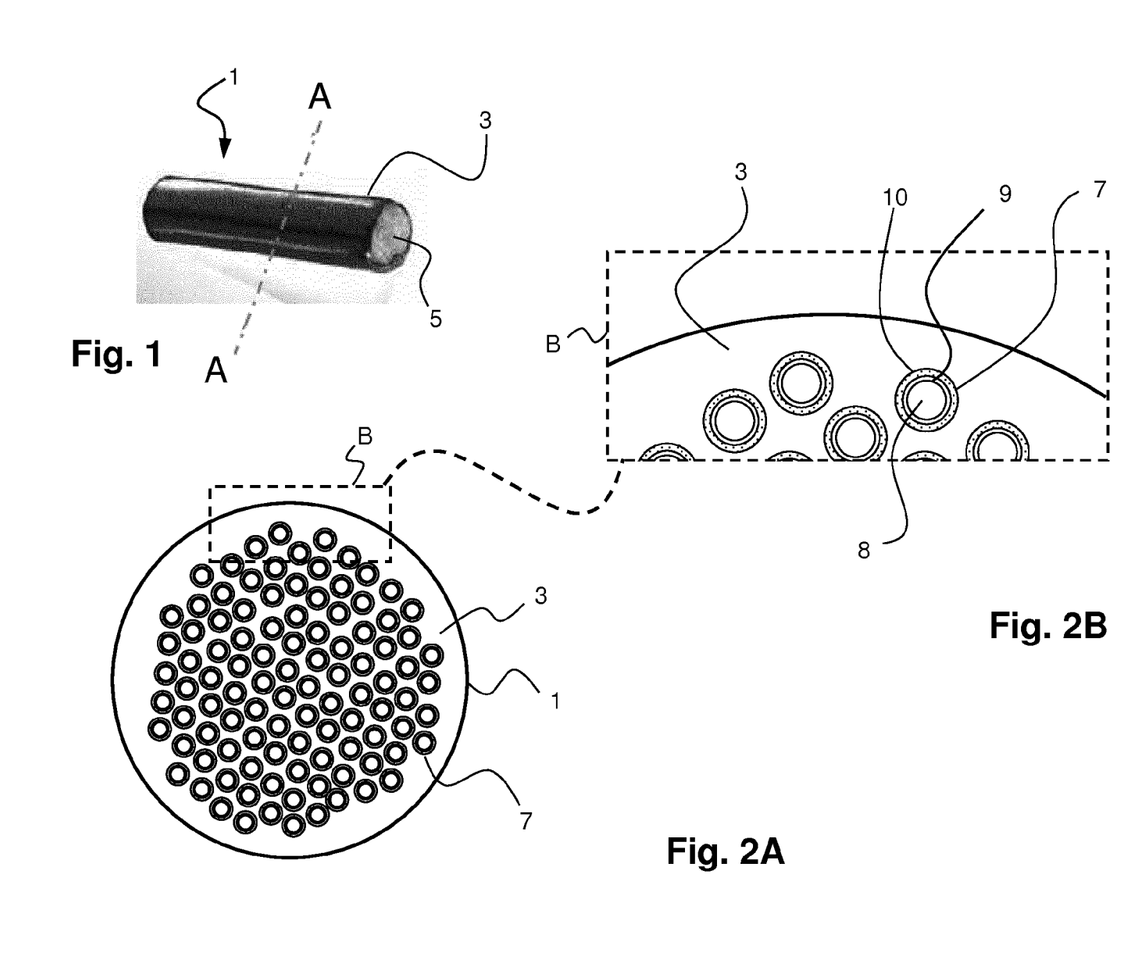
FIG. 1 illustrates a pellet of a long glass fibre reinforced polypropylene composition.
FIG. 2A illustrates a cross section of the pellet in FIG. 1 across the line A-A.
FIG. 2B illustrates an enlargement of a section of FIG. 2A.

FIG. 1 illustrates a pellet 1 of a long glass fibre reinforced polypropylene (LGF-PP) composition fabricated using a method according to the present invention. Pellet 1 consists of a thermoplastic polymer matrix 3, here polypropylene, forming a sheath visible on the outside. The core of pellet 1 is filled with a plurality of glass fibre filaments 5. Fibre filaments 5 in pellet 1 are usually and preferably aligned with each other. However, the invention is not limited to manufacturing processes wherein the filaments are aligned in the pellets, as the skilled person may appreciate that a certain misalignment of the fibre filaments 5 may be present in pellet 1. The length of glass fibre filaments 5 corresponds to the length of pellet 1. After injection moulding of pellets 1 the original usual alignment of fibre filaments 5 in pellets 1 usually disappears resulting in a more or less random orientation of fibre filaments 5 that are evenly distributed within the polypropylene matrix. As will be appreciated, some applications however may require a certain alignment, which, at the choice of the user, may be set by proper injection moulding conditions. In the present example fibre filaments 5 within pellet 1 are aligned with each other. Pellet 1 is manufactured by using a continuous multifilament strand of glass fibre filaments as a basis, and embedding the strand of fibres in a thermoplastic polymer (here polypropylene) material. The term embedding as used herein is to be understood as a sheathing process wherein the continuous multifilament strand is provided with a sheath of thermoplastic polymer (in the present example polypropylene). The multifilament strand consists of many individual fibre filaments, a typical multifilament strand as referred to here could include thousands of fibres. The multifilament strand or roving as referred to here could include a single strand, or could be formed of two, three, four, or more strands. The thermoplastic polymer matrix 3 forms a sheath on the strand. In general thermoplastic polymer matrix 3 will not be present between the individual fibre filaments. The thermoplastic polymer is applied in molten state after which the sheathed multifilaments strand is cooled. After cooling pellets 1 are formed by cutting the sheathed impregnated continuous multifilament strand into pellets having a certain length. A common length of the pellets is about 12 mm. More in general the length of pellets 1 is from 2 to 50 mm, preferably from 5 to 30 mm, more preferably from 6 to 20 mm and most preferably from 10 to 15 mm.

FIG. 2A illustrates schematically a cross section of pellet 1 across the line A-A in FIG. 1. FIG. 2A reveals the polypropylene material 3 embedding a plurality of aligned fibre filaments such as fibre filament 7. The present inventors have observed that in practice fibre filaments 5 are tightly packed leaving almost no room available between the individual fibre filaments 5. For this reason thermoplastic polymer matrix 3 will form only a sheath around the fibre filaments 5 and will not, or only to a very low extent penetrate in the interstices between individual fibre filaments 5.

The dashed square B illustrates a section of pellet 1 which is enlarged in FIG. 2B. FIG. 2B reveals that each of the fibre filaments 7 comprises a glass fibre filament core 8, a first coating 9 (usually silane) and a second coating 10. The second coating 10 is the impregnating agent as used in the method of the present invention and has a low viscosity at application temperature. FIG. 2B shows an ideal situation wherein each fibre filament 7 is fully surrounded by a layer of impregnating agent 10. The skilled person will appreciate that, given the nature of the method of the present invention, not every fibre filament 7 may be fully surrounded by a layer of impregnating agent 10.

Suitable impregnating agents are described in International application No. WO2009080281. Said impregnating agent is non-volatile, has a melting point of at least about 20° C. below the melting point of the thermoplastic polymer matrix 3 and has a viscosity of from 2.5 to 100 cS at application temperature. The viscosity of impregnating agent 10 should be lower than 100 cS, preferably lower than 75 cS and more preferably lower than 25 cS at application temperature. The viscosity of impregnating agent 10 should be higher than 2.5 cS, preferably higher than 5 cS, and more preferably higher than 7 cS at the application temperature. An impregnating agent having a viscosity higher than 100 cS is difficult to apply to the continuous multifilament strand(s). Low viscosity is needed to facilitate good wetting performance of the fibres, but an impregnating agent having a viscosity lower than 2.5 cS is difficult to handle, e.g., the amount to be applied may be more difficult to control. The application temperature of the impregnating agent is selected such that the desired viscosity range is obtained.

The melting point of impregnating agent 10 is preferably at least about 20° C. below the melting point of the thermoplastic polymer matrix 3. Without being wished to be bound to any theory, the inventors think this difference in melting points, and thus in solidification or crystallisation points, promotes impregnation of the fibre filaments 5 also after applying the thermoplastic sheath and cooling the sheathed strand, and fibre dispersion during subsequent moulding. Preferably, impregnating agent 10 has a melting point at least 25 or 30° C. below the melting point of the thermoplastic polymer matrix 3. For instance, when thermoplastic polymer matrix 3 is polypropylene having a melting point of about 160° C., the melting point of impregnating agent 10 may be at most about 140° C.

Impregnating agent 10 used in the present invention has at least two functions. Firstly it mechanically couples fibre filaments 5, at least in part, to each other and to the thermoplastic polymer matrix 3 (i.e. the sheath) in pellet 1. This function is important in view of reducing the amount of fibre filaments 5 separating from pellets 1 when such pellets 1 are subjected to repetitive mechanical loads or upon transportation of pellets 1 through a piping system, for example by means of air drag or upon transportation by means of a vibrating conveyor means, such as a conveyor belt. Secondly, impregnating agent 10 is a compound that enhances the dispersion of fibre filaments 5 in the thermoplastic polymer matrix 3 during a moulding process wherein pellets 1 are moulded into articles in which articles the fibre filaments are distributed in the thermoplastic polymer matrix 3 of the article in a substantially uniform manner.

Suitable examples of impregnating agents include low molar mass compounds, for example low molar mass or oligomeric polyurethanes, polyesters such as unsaturated polyesters, polycaprolactones, polyethyleneterephthalate, poly(alpha-olefins), such as highly branched polyethylenes and polypropylenes, polyamides, such as nylons, and other hydrocarbon resins. As a general rule, a polar thermoplastic polymer matrix requires the use of a impregnating agent containing polar functional groups; a non-polar polymer matrix involves using a impregnating agent having non-polar character, respectively. For example, for reinforcing a polyamide or polyester, the impregnating agent may comprise low molecular weight polyurethanes or polyesters, like a polycaprolactone. For reinforcing polypropylenes, the impregnating agent may comprise highly branched poly (alpha-olefins), such as polyethylene waxes, modified low molecular weight polypropylenes, mineral oils, such as, paraffin or silicon and any mixtures of these compounds. Preferably, the impregnating agent comprises a highly branched poly(alpha-olefin) and, more preferably, the impregnating agent is a highly branched polyethylene wax, in case the thermoplastic polymer to be reinforced is polypropylene; the wax optionally being mixed with for example from 10 to 80, preferably 20-70, mass % of a hydrocarbon oil or wax like a paraffin oil to reach the desired viscosity level. In this respect, it is noted that the impregnating agent preferably has a low viscosity level in order to ensure that the liquid properly penetrates the strand such as to apply the coating to the internal fibre filaments of the strand.

The continuous multifilament strand comprising a plurality of continuous fibre filaments is usually provided from a bobbin on which it is wound. Preferably the fibre filaments are glass filaments. A continuous multifilament strand of continuous glass filaments which contains at most 2 wt % of a sizing composition is preferably employed in the process of present invention. The glass fibre filament density of the continuous multifilament strand of glass fibre filaments may vary within wide limits. Preferably, the multifilament strand contains from 500 to 10000 glass filaments per strand, more preferably from 2000 to 5000 glass filaments per strand. The linear density of the multifilament strand preferably is from 1000 to 5000 tex, corresponding to 1000 to 5000 grams per 1000 meter. The thickness of the glass fibre filaments preferably is from 5-50 µm, more preferably from 10-30 µm, even more preferably from 15-25 µm. Usually the glass fibre filaments are circular in cross section meaning the thickness as defined above would mean diameter.

Suitable examples of materials for thermoplastic polymer matrix 3 include polyamides, such as polyamide 6, polyamide 66, or polyamide 46; polyolefins like polypropylenes and polyethylenes; polyesters, such as polyethylene terephthalate, polybutylene terephthalate; polycarbonates; polyphenylene sulphide; polyurethanes; also any type of polymer blends and compounds and any combinations thereon. More particularly, polypropylene, polybutylene terephthalate and polyamide 6 may be used. Preferably, the thermoplastic polymer used in the sheathing process is a crystalline polypropylene, like a propylene homopolymer, a random copolymer, or a so-called heterophasic copolymer of propylene and ethylene and/or another alpha-olefin.

Figure 3:
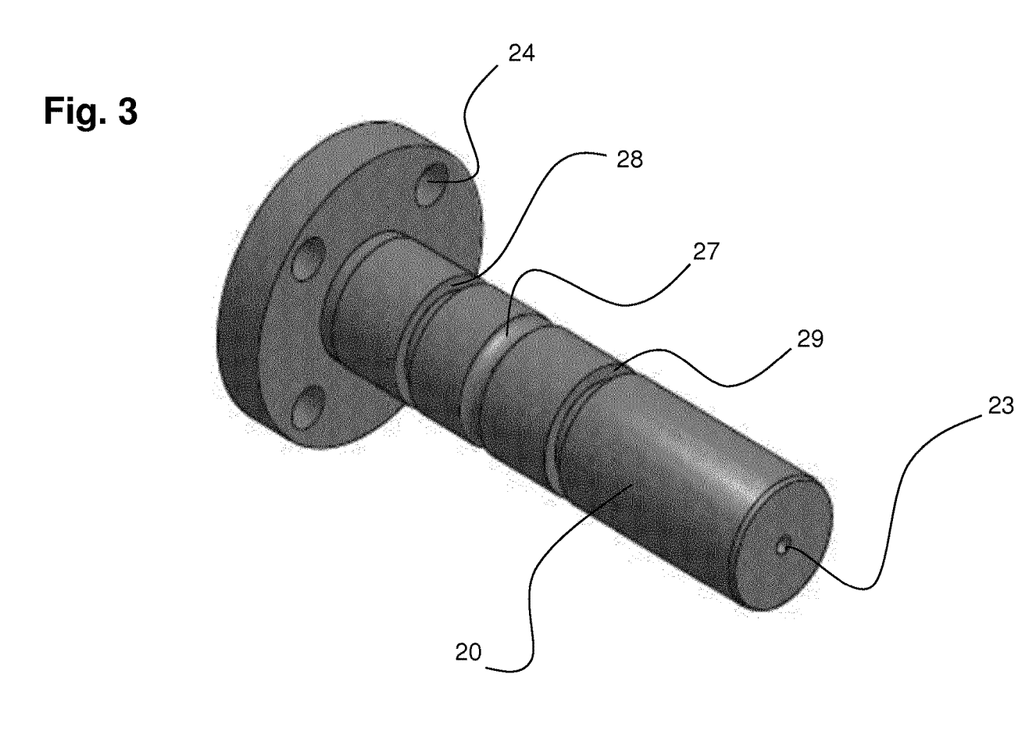
FIG. 3 schematically illustrates a device (die) for use in a method according to the present invention.

In FIG. 3 there is provided a schematic illustration of a die insert 20 for applying an impregnating agent in accordance with the principles of the present invention. Die insert 20 consists of an entrance opening (not visible in FIG. 3, but visible in FIG. 4 as reference numeral 22) and an exit opening 23. In use, a continuous multifilament strand is provided at the entrance opening and conveyed through a transport section towards exit opening 23. The transport section extends from entrance opening 22 to exit opening 23 in die insert 20, and is not visible in FIG. 3 (visible in FIG. 4, reference numeral 25). Die insert 20 comprises a plurality of fixing holes 24 allowing it to be fixed to the housing of a device for applying impregnating agent 10. The present invention is not limited to such configuration however and other means of fixing may be also be applied. In addition, die insert 20 comprises first sealing slot 28 and second sealing slot 29. In between sealing slots 28 and 29 there is provided an annular pressure chamber 27 wherein, in use, impregnating agent 10 will be pressurized. In alternative embodiments wherein more than one axial position is used for applying the impregnating agent, several annular pressure chambers 27 may be present in the die insert (although not essential in view of other implementation options available and known to the skilled person).

Figure 4:
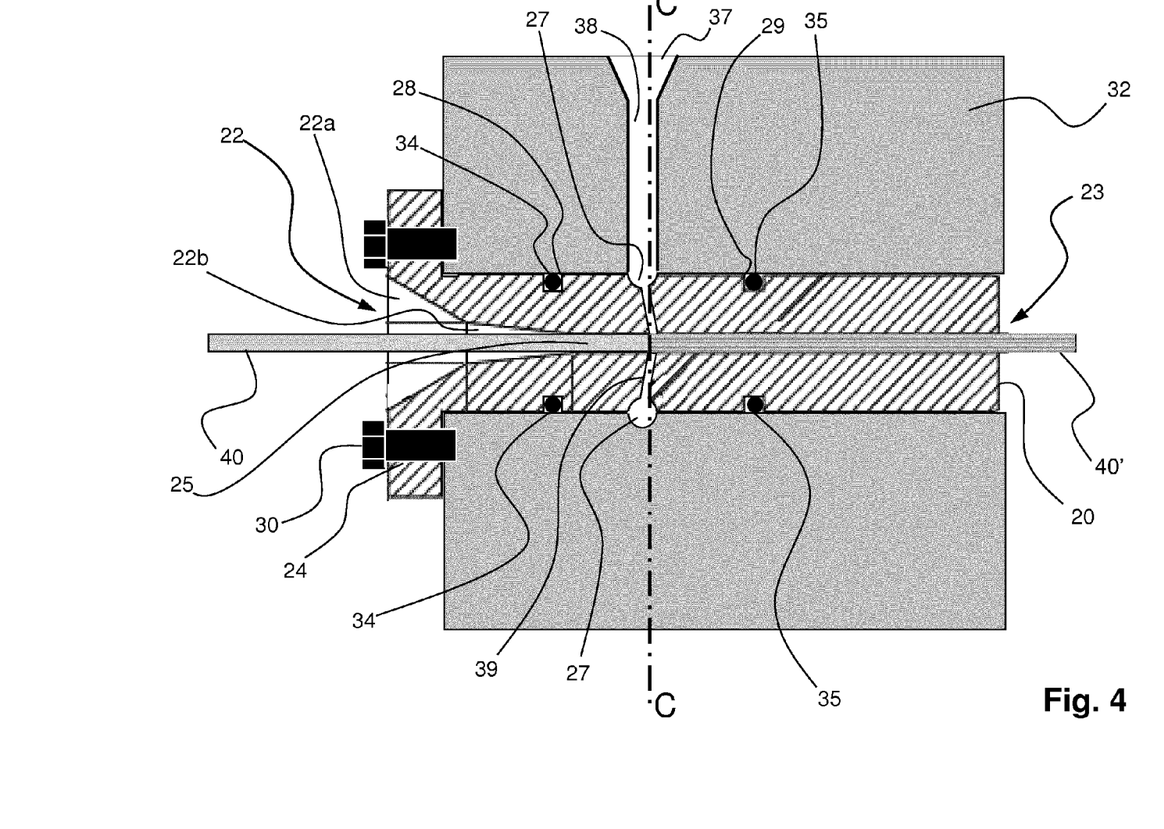
FIG. 4 schematically illustrates a device for use in a method according to the present invention illustrated in cross section.

A cross section of a device for applying an impregnating agent (or die) is schematically illustrated in FIG. 4. The device comprises a housing 32 having an internal section wherein the die insert 20 is fixed by means of bolts 30 extending through the fixing holes 24 into the housing 32. First sealing slot 28 comprises a first sealing ring 34, and a second sealing slot 29 comprises a second sealing ring 35 together defining a sealed section in between the rings 34 and 35 of die insert 20. Housing 32 further comprises an impregnating agent supply opening 37 and a supply channel 38 for conveying the impregnating agent to annular pressure chamber 27.

The transport section 25 of die insert 20 extends between entrance opening 22 and exit opening 23, preferably in a straight line. In use, a multifilament strand or yarn 40 is provided to the die insert 20 through entrance opening 22, and is conveyed through the transport section 25 towards the exit opening 23. The location where impregnation agent 10 is jetted onto the at least one multifilament strand 20 is referred to as impregnating section. Said in another way, the impregnation section is that part of transport section 25 where impregnating agent 10 is applied. Transport section 25 may have one or more impregnating sections.

From annular pressure chamber 27, a plurality of concentrically positioned jetting channels 39 extend towards transport section 25 in die insert 20. The jetting channels 39 allow forcing of the impregnating agent under pressure from the annular pressure chamber to the transport section, for jetting the impregnating agent onto the multifilament strand 40.

Impregnating agent 10 is forced under influence of a pressure difference $p_1-p_0$ between the pressure $p_1$ of the liquid in the pressure chamber 27 and the pressure $p_0$ in the transport section of the die insert through which the strand 40 is conveyed. As will be appreciated, the jetting channels are preferably all of a same length and same diameter, as this ensures that the pressure gradient along the channels will be equal yielding a same outflow velocity from the orifices of the jetting channels 39. This ensures the application of impregnating agent 10 in a uniform and homogeneous manner. Moreover, as the jetting channels are concentrically arranged around the strand, extending in radial direction thereto, the impregnating agent can be applied all around the circumference of the strand 40. A jetting unit as herein defined is to be understood as the unit that enables a jet of impregnating agent to be directed towards multifilament strand 40. In FIG. 4 such jetting unit comprises the jetting channels 39, annular pressure chamber 27, supply channel 38 and supply opening 37. The skilled person will understand that jetting of impregnation agent 10 is only possible when such impregnating agent is conveyed through jetting channels 39 under a certain pressure. Depending on the design, in particular the length and diameter, of jetting channels 39 and the viscosity of impregnating agent 10, a certain offset pressure is needed for obtaining a jet. If the pressure is below such an offset pressure impregnating agent 10 will merely flow from jetting channels, which will not result in the desirable effect.

As a result of the jetting of impregnating agent 10 onto the at least one multifilament strand 40 the pressure in transport section 25 may be equal to the pressure of the surrounding. This allows more flexible design criteria for the transport section, in particular in terms of the dimensions thereof. Transport section 25 may be made sufficiently large in diameter and shape to allow the passage of the multifilament strand with its variable diameter and irregular shape. The same of course holds for the entrance 22 and exit openings 23 to the transport section 25. Said in another way, the pressure inside transport section 25 may be equal to the pressure of the surroundings of the device, so that the risk of impregnating agent leaking out of the device is reduced to a minimum even when the dimensions of entrance opening 22 and exit opening 23 are such that they can accommodate the maximum diameter of the at least one multifilament strand 40.

Transport section 25, entrance opening 22, and exit opening 23, all comprise cross-sectional dimensions that are suitable for conveying at least one multifilament strand. Although good results have been achieved using a transport section of 2.8 mm in diameter, the diameter of the transport section 25 may for example be within a range of 2.0 mm to 4.0 mm. The diameter of the exit opening 23 may be within a range of 2.0 mm to 4.0 mm, and optimally 2.8 mm. Moreover entrance opening 22 may be tapered, as illustrated in FIG. 4, including a first tapered section 22a and a second tapered section 22b. It may be appreciated that the use of a tapered sectioned entrance opening 22 is optional, and alternatively the entrance opening may be straight opening such as the exit opening 23. In FIG. 4, first tapered section 22a of entrance opening 22 has a first diameter of 19.5 mm gradually decreasing to a second diameter of 6.0 mm. The second tapered section gradually decreases from the second diameter of 6.0 mm toward a third diameter of 2.8 mm. The above examples of 19.5 mm for the first diameter, 6.0 mm for the second diameter, and 2.8 mm for the third diameter are to considered as examples. These dimensions have been tested and provide the desired results. In general, the diameters for a tapered entrance opening may be selected within the following ranges: the first diameter between 2.0 mm and 30.0 mm (optimal between 6.0 mm and 20.0 mm), the second diameter at least 2.0 mm smaller than or equal to the first diameter with an optimal diameter of 6.0 mm, the third diameter between 2.0 mm and 4.0 mm (optimally 2.8 mm). In case of a tapered entrance opening 22 (22a, 22b) such as illustrated in FIG. 4, the first diameter is larger than or equal to the second diameter, and the second diameter is larger than or equal to the third diameter. In case a straight entrance opening would be applied (i.e. an entrance opening similar to the exit opening 23), it's diameter could be selected within a range of 2.0 mm to 4.0 mm.

Figure 5:
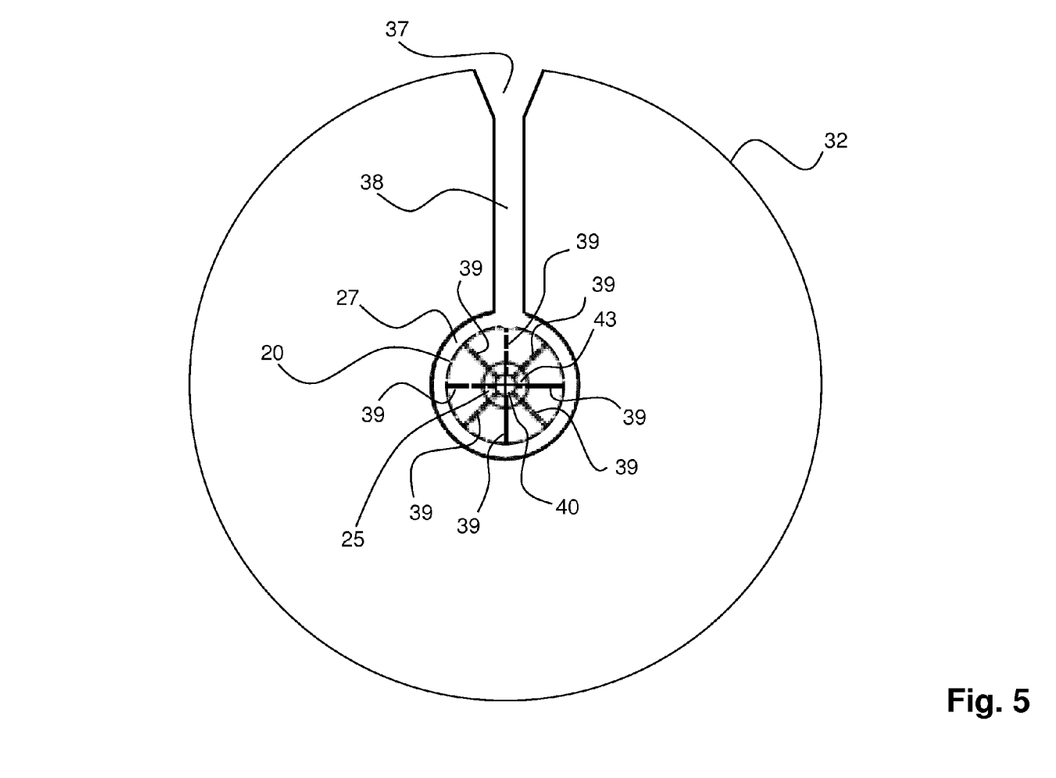
FIG. 5 illustrates a cross section of the device of FIG. 4 over the line C-C.

A cross section of the die of FIG. 4 across the line C-C is illustrated in FIG. 5. FIG. 5 schematically illustrates impregnating agent supply opening 37, supply channel 38, and annular pressure chamber 27. From annular pressure chamber 27, a plurality of jetting channels 39 extend towards transport section 25, through die insert 20. As can be seen in FIG. 5, the diameter of transport section 25 allows for variations of the diameter of multifilament strand 40 in terms of the shape and/or the cross sectional diameter. In use, a plurality of jets 43 is directed from the orifices of jetting channels 39 to multifilament strand 40 in transport section 25.

Figure 6:
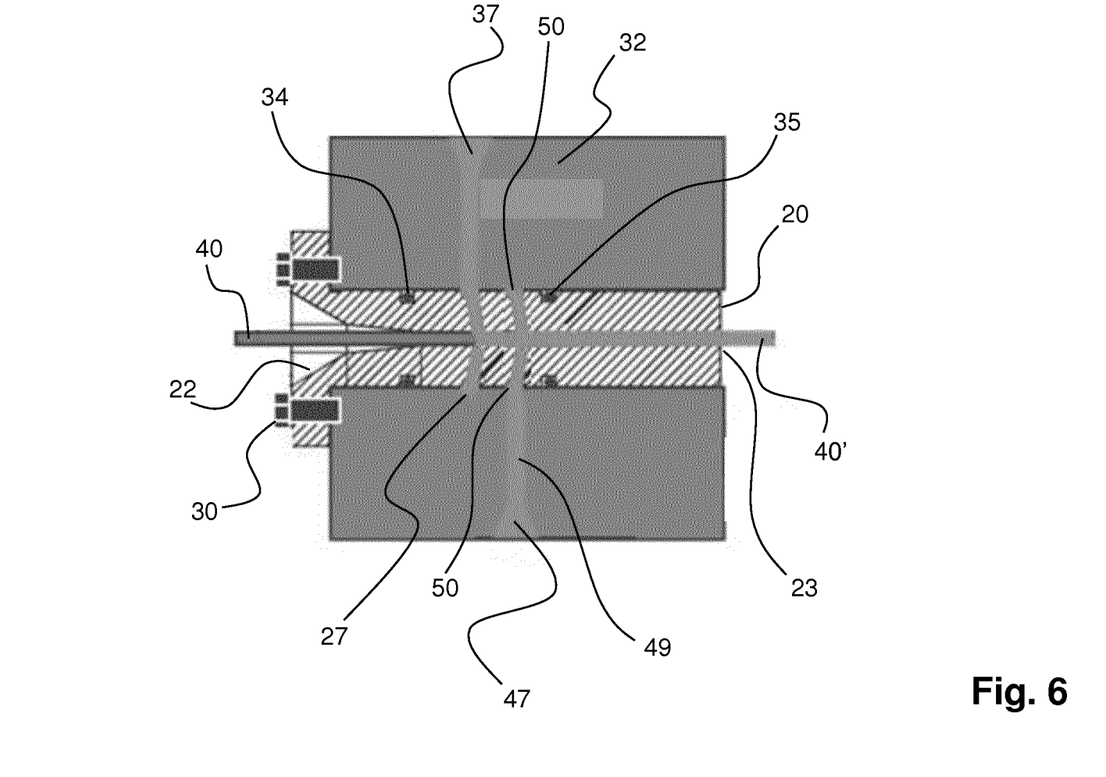
FIG. 6 illustrates a further embodiment of a device according to the present invention.

FIG. 6 schematically illustrates a further embodiment of a device in accordance with the present invention. In addition to supply channel 38 (not shown in FIG. 6) and impregnating agent supply opening 37, the device of FIG. 6 comprises a further supply channel 49 and further supply opening 47. Further supply channel 49 provides the impregnating agent to a further annular pressure chamber 50 from where it is jetted onto multifilament strand(s) 40 through a further plurality of jetting channels.

As can be seen in FIG. 6, the annular chamber 27 and the annular chamber 50 are located at different axial positions relative to the transport section. The radial position of the jetting channels of the two jetting units may be offset so that the impregnating agent may be applied to multifilament strand in a more uniform manner. This is in particular of importance if the amount of jetting channels of a jetting unit is limited due to the size of die insert 20 and/or the targeted diameter of the jetting channels. For example if from a constructional point of view a jetting unit can only comprise three jetting channels, then the use of two jetting units with radial offset jetting channels allows the application of impregnating agent on six different radial positions.

It further follows from both FIG. 4 and FIG. 6 that the jetting channels may be slightly angled relative to the axial direction of the transport section 25. The present inventors found that such embodiment provided an efficient coverage of the multifilament 40. In FIGS. 4 and 6, the impregnated multifilament strand(s) are referred to with reference numeral 40', leaving exit opening 23.

The jetting unit as herein described preferably contains a number of 2-10 jetting channels positioned concentrically around transport section 25.

In an embodiment the jetting unit comprises a jetting slit which is continuous in radial direction rather than a plurality of jetting channels. This embodiment is preferred as it will provide a jet that is also continuous in radial direction which will result in a more uniform application of impregnating agent compared to the embodiment where impregnating agent is jetted from a plurality of jetting channels. Similar to the jetting channels the jetting slit may be positioned perpendicular or under a certain angle with respect to transport section 25. Several jetting units containing such a jetting slit may be positioned along the axial direction of transport section 25. Combinations of jetting units containing jetting channels and jetting units containing a jetting slit also fall within the scope of the present invention. For the avoidance of doubt it has to be understood that a jetting unit may either comprise a jetting slit or a plurality of jetting channels, but not both.

The present invention has been described in terms of some specific embodiments thereof. It will be appreciated that the embodiments shown in the drawings and described here and above are intended for illustrative purposes only, and are not by any manner or means intended to be restrictive on the invention. The context of the invention discussed here is merely restricted by the scope of the appended claims.

The invention claimed is:

1. A method of manufacturing a fiber reinforced polymer composition comprising:
   providing a continuous multifilament strand comprising a plurality of continuous fiber filaments,
   applying an impregnating agent to said continuous multifilament strand to form an impregnated continuous multifilament strand, and
   applying a sheath of thermoplastic polymer material around the impregnated continuous multifilament strand for providing said fiber reinforced polymer composition,
   wherein a plurality of jetting units, each of which comprises at least two jetting channels or a jetting slit are arranged at various axial positions along said continuous multifilament strand for jetting the impregnating agent on the continuous multifilament strand,
   wherein said impregnating agent has a viscosity of from 2.5 to 100 cS at application temperature and is applied by jetting said impregnating agent onto the continuous multifilament strand, and
   wherein said jetting is performed by pressurizing the impregnating agent and conveying it through the at least two jetting channels of each of the plurality of jetting units or through the jetting slit of each of the plurality of jetting units towards the continuous multifilament strand.

2. A method according to claim 1, wherein the at least two jetting channels of each of the plurality of jetting units are, and/or the jetting slit of each of the plurality of jetting units is, arranged concentrically around the continuous multifilament strand, said jetting channels of each of the plurality of jetting units or said jetting slit of each of the plurality of jetting units extending in a radial direction relative to said continuous multifilament strand.

3. A method according to claim 1, wherein the jetting channels of each of the plurality of jetting units and/or the jetting slit of each of the plurality of jetting units extend transverse to or under an angle with an axial direction of the continuous multifilament strand.

4. A method according to claim 3, wherein the jetting channels of each of the plurality of jetting units and/or the jetting slit of each of the plurality of jetting units extend under an angle of from 45° to 135° relative to the continuous multifilament strand so as to jet the impregnating agent in at least one of a downstream direction and upstream direction.

5. A method according to claim 1, wherein the jetting channels of each of the plurality of jetting units each comprise an outflow orifice and/or wherein the jetting slit of each of the plurality of jetting units comprises an outflow opening for directing the impregnating agent to the continuous multifilament strand, wherein a pressure $p_0$ at each outflow orifice or each outflow opening is smaller than a pressure $p_1$ at which said impregnating agent is pressurized, and wherein the pressure difference $p_1-p_0$ is smaller than 40 bar.

6. A method according to claim 1,
wherein the plurality of jetting units each comprise at least three jetting channels or a jetting slit, and
wherein said jetting is performed by pressurizing the impregnating agent and conveying it through the at least three jetting channels of each of the plurality of jetting units and wherein the at least three jetting channels of each of the plurality of jetting units are, and/or the jetting slit of each of the plurality of jetting units is, arranged concentrically around the continuous multifilament strand, said jetting channels of each of the plurality of jetting units or said jetting slit of each of the plurality of jetting units extending in a radial direction relative to said continuous multifilament strand.

7. A method according to claim 1, wherein in said step of pressurizing the impregnating agent, the impregnating agent is pressurized to a pressure which is sufficient to form a jet of impregnating agent from the at least two jetting channels of each of the plurality of jetting units.

* * * * *